United States Patent
Frid-Nielsen et al.

(10) Patent No.: US 7,209,888 B2
(45) Date of Patent: Apr. 24, 2007

(54) SYSTEM AND METHOD FOR APPOINTMENT RECONCILIATION

(75) Inventors: Martin Frid-Nielsen, Santa Cruz, CA (US); Richard Lee Schwartz, Paris (FR); Steven Ray Boye, Los Gatos, CA (US)

(73) Assignee: Nokia Corporation, Helsinki (FI)

( * ) Notice: Subject to any disclaimer, the term of this patent is extended or adjusted under 35 U.S.C. 154(b) by 1280 days.

(21) Appl. No.: 09/060,206

(22) Filed: Apr. 14, 1998

(65) Prior Publication Data

US 2002/0010607 A1    Jan. 24, 2002

Related U.S. Application Data

(63) Continuation of application No. 08/649,824, filed on May 17, 1996, now Pat. No. 5,778,346, which is a continuation of application No. 07/823,567, filed on Jan. 21, 1992, now Pat. No. 5,519,606.

(51) Int. Cl.
G06F 9/46    (2006.01)

(52) U.S. Cl. .............................. 705/8; 705/9

(58) Field of Classification Search .................. 705/8, 705/9, 32; 368/72, 82; 283/114; 709/203; 345/961–965
See application file for complete search history.

(56) References Cited

U.S. PATENT DOCUMENTS

| | | | |
|---|---|---|---|
| 4,162,610 A | | 7/1979 | Levine |
| 4,769,796 A | * | 9/1988 | Levine .................. 368/29 |
| 4,866,611 A | * | 9/1989 | Cree et al. .................. 708/112 |
| 4,881,179 A | * | 11/1989 | Vincent .................. 345/118 |
| 4,939,689 A | | 7/1990 | Davis et al. |
| 4,977,520 A | | 12/1990 | McGaughey III et al. .................. 364/521 |
| 5,113,380 A | | 5/1992 | Levine .................. 368/10 |
| 5,134,564 A | | 7/1992 | Dunn et al. |
| 5,187,787 A | | 2/1993 | Skeen et al. |
| 5,224,212 A | | 6/1993 | Rosenthal et al. .......... 395/250 |

(Continued)

FOREIGN PATENT DOCUMENTS

EP     0276 426    *  8/1988

(Continued)

OTHER PUBLICATIONS

Mefford, Michael, "Track your time and appointments with schedule.com. (includes related articles on customizing schedule and schedule command)", PC Magazine, v9, n6, p. 303(7), Mar. 27, 1990, Dialog file 47, Accession No. 03386823.

(Continued)

*Primary Examiner*—Frantzy Poinvil
(74) *Attorney, Agent, or Firm*—Ernest J. Beffel, Jr.; Haynes Beffel & Wolfeld LLP

(57) ABSTRACT

A system for processing multiple schedules, constructed in accordance with the principle of the present invention, includes an information processing system having a memory and a processor; an input device for entering user information; a display device for showing scheduling information; an interface for sending and/or receiving information from another source; and the processor enabling reconciling two schedules by building synchronized lists, from which the user may effect a reconciliation.

38 Claims, 11 Drawing Sheets

U.S. PATENT DOCUMENTS

| | | | |
|---|---|---|---|
| 5,251,291 | A | 10/1993 | Malcolm |
| 5,278,978 | A | 1/1994 | Demers et al. |
| 5,315,709 | A | 5/1994 | Alston, Jr. et al. |
| 5,327,555 | A * | 7/1994 | Anderson .................. 707/201 |
| 5,333,252 | A | 7/1994 | Brewer, III et al. |
| 5,392,390 | A | 2/1995 | Crozier |
| 5,442,783 | A | 8/1995 | Oswald et al. ............. 395/600 |
| 5,519,606 | A * | 5/1996 | Frid-Nielsen et al. .......... 705/9 |
| 5,530,853 | A | 6/1996 | Schell et al. |
| 5,666,530 | A | 9/1997 | Clark et al. |
| 5,706,509 | A | 1/1998 | Man-Hak Tso |
| 5,727,202 | A | 3/1998 | Kucala |
| 5,758,337 | A | 5/1998 | Hammond |
| 5,813,013 | A | 9/1998 | Shakib et al. |
| 5,857,201 | A | 1/1999 | Wright, Jr. et al. |
| 5,926,816 | A | 7/1999 | Bauer et al. |
| 6,272,074 | B1 | 8/2001 | Winner |

FOREIGN PATENT DOCUMENTS

EP            0276 429      *    8/1988

OTHER PUBLICATIONS

Kurkowski, "In sync: CrossWind's Synchronize software coordinates user's schedules and company resources efficient project management. (Crosswind technologies, Inc. Project management software)", DG Review, v12, n7, p. 20(3), Jan. 1992, Dialog file 275, Accession No. 01512963.

Gunnerson, "Staying in Sync, at Home and on the Road", Network Computing, 1991, n210, 104,Date Oct. 1, 1991, Dialog file 647, Accession No. 00605915.

Microsoft Window User's guide for the Windows graphical Environment Version 3.0, Copyright 1985-1990, pp. 50-53 and 370-382.

Mallett, M., Sorting Out Schedules, BYTE, pp. 263-268, Dec. 1991.

Defendant and Cross-Complainant Extended Systems, Inc.'s Amended Identification of Prior Art Publications Pursuant to Patent L.R. 3-3(a) Dated Oct. 31, 2003 [Not Prior Art].

Hewlett-Packard, Connectivity Pack for the HP 95LX User's Guide, 1991, pp. P0005691-P0005725.

Computer Corporation of America, CCA-1984 Distributed Management of Replicated Data, Final Report, Oct. 9, 1884, pp. SYW000412-SYW000453.

Hewlett-Packard, CPK100LX Connectivity Pack User's Guide for the HP200LX and the HP100LX, 1994, pp. ESI352089-ESI352177.

Oracle, Oracle7TM Server Distributed Systems, vol. II: Replicated Data, Release 7.3, Feb. 1996, pp. ESI009616-ESI010076.

Lotus, LotusMobile Lotus cc: Mail Release 2, Getting Started Guide, 1993, pp. ESI326581-ESI326769.

Intellilink, IntelliLink for Windows User's Guide, Version 3.0, 1993, pp. SYW000799-SYW000959.

Lotus, Lotus Organizer User's Guide, Release 1.0, 1992, pp. ESI327269-ESI327410.

Time Technology, TT Interchange, 1995, UK, pp. ESI326879-ESI326896.

Sheth, Amit P., A Tool for Intergrating conceptual Schemas and User Views, IEEE, 1988, pp. ESI327056-ESI327063.

Mannino et al., Matching Techniques in Global Schema Design, IEEE, 1984, pp. ESI327048-ESI327055.

Oracle, Oracle White Paper, Oracle7WP95 Oracle7TM Distributed Database Technology and Symmetric Replication, Apr. 1995, pp. ESI009052-ESI009080.

Apple Computer, Inc., FileMaker 4 Setting the Data Management Standard, Owner's Manual for Apple Macintosh, 1994, pp. APP/PUMATECH0001-APP/PUMATECH0437.

Goldberg et al., Using Collaborative Filtering to Weave an Information Tapestry, Communications of the ACM, Dec. 1992, vol. 35, No. 12, pp. ESI352338-ESI352347.

Traveling Software, Inc., PC-Link for the Casio B.O.S.S., Release 2, 1989, pp. P0005834-P0005880.

Apple Computer, Inc., NCUManual Newton Connection Utilities User's Manual, 1996, pp. APP/PUMATECH0713-APP/PUMATECH0815.

Syware, DST Guide, Database Subsetting Tool: Introduction to DST& DST Designer's Guide, 1993, pp. SYW000110-SYW000286.

Oracle, Oracle7 Server SQL Reference Manual, Release 7.3, Feb. 1996, pp. ESI010077-ESI010810.

Informix, Informix Guide to SQL Tutorial Version 7.1, Dec. 1994, pp. ESI009100-ESI009615.

Sharp, OL2 Sharp Organizer Link II, Model OZ-890 Operation Manual, no specified date, pp. P0005745-P0005801.

Intellilink, Intellilink brochure 1990, pp. P0005731-P0005732.

Now Software, Now Up-to-Date Version 2.0 User's Guide, 1990-92, pp. ESI353130-ESI353461.

Claris, FileMaker® Pro User's Guide, 1992, pp. ESI360607-ESI361026.

Poesio et al., Metric Constraints for Maintaining Appointments: Dates and Repeated Activities, no specified date; ESI353550-ESI353557.

Expert Report of John P. J. Kelly, Ph.D in Case No. C02-1916 DLJ, USDC, N.D. Cal., 13 pp., dated Oct. 24, 2003.

Compilation of claim charts referred to in Expert Report of John P.J. Kelly, 391 pages.

* cited by examiner

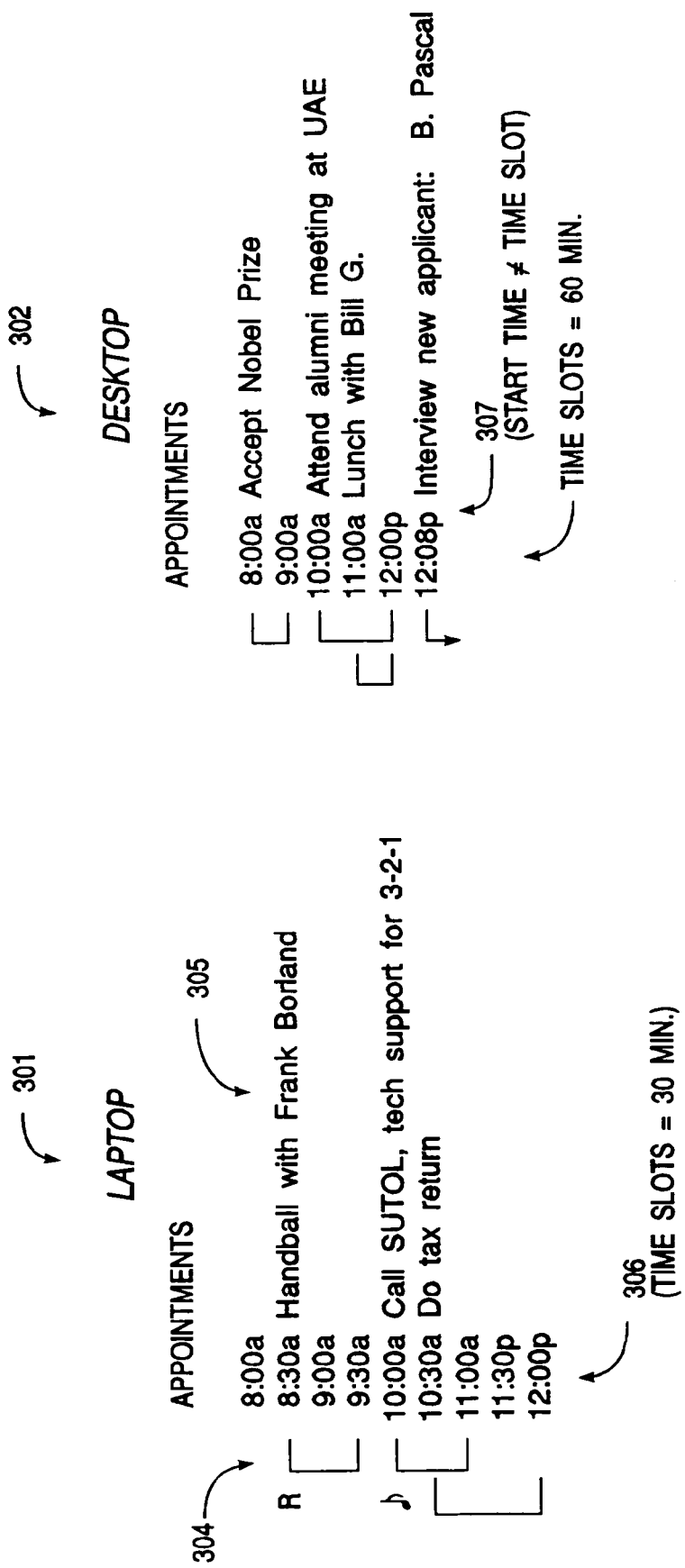

SYSTEM AND METHOD FOR APPOINTMENT RECONCILIATION

CROSS-REFERENCE TO RELATED APPLICATIONS

This application claims priority from, and is a continuation of Ser. No. 08/649,824, filed May 17, 1996, now U.S. Pat. No. 5,778,346, which is a continuation of Ser. No. 07/823,567, filed Jan. 21, 1992, now U.S. Pat. No. 5,519,606, the disclosures of which are hereby incorporated by reference.

BACKGROUND OF THE INVENTION

The present invention relates generally to the area of information processing and, more particularly, to apparatus and methods for reconciling ordinal information, especially time-based information.

Successful management of one's time is a goal that every successful professional must achieve. One's business day may be swept away in a deluge of meetings and appointments, all of which must be somehow managed. An attempt to manage this task on paper, such as with a simple wall calendar, is unworkable for all but the simplest of schedules. More likely, such unsophisticated aids to managing one's time will lead to scheduling conflicts, missed appointments, botched deadlines, and angry clients.

The first allies that professionals discovered were portable organizers, such as the Daytime™ or the Lafax™. However, an increasing number are discovering the power of personal computers for managing appointments. Several scheduling packages are available for the PC. While not as portable as paper organizers, scheduling packages offer increased flexibility in other areas. For example, one may view his or her schedule from a variety of views—by month, week, day, or priority—and attach detailed notes to appointments. Additional options available include the ability to automatically schedule a meeting for the first Monday of every other month, or display horizontal bars which graphically represent one's weekly schedule, so that free time can be quickly pinpointed. Other options include the ability to easily edit an entry, and set alarms as a reminder of important appointments.

With ever increasing emphasis on miniaturization and portability, several of the features of scheduling packages may now be found in handheld information processing devices, such as the Sharp Wizard™ or the Casio BOSS™. Being roughly the size of a handheld calculator, these electronic organizers are often carried when one is away from the office. As a tradeoff for portability, however, these devices typically forego several of the more desirable features found on desktop personal computers (e.g., full color graphics display). As a result, it is common for a professional to employ a personal computer to manage his or her time, yet carry a portable organizer when he or she is away from the office. Upon returning to the office, the information in the personal computer is then updated with the new information in the portable organizer.

Updating or reconciling two sets of information, whether between a PC and an organizer, or between two computers joined by a communication network, has never been easy. The reconciliation of scheduling information has been particularly difficult. Not only must one take into account when an event occurs, but one must also account for the duration of the event. While prior art organizers and scheduling packages are very useful for managing one's own schedule, they have thus far been inadequate for resolving two or more schedules. As a result, a user who wishes to reconcile two different schedules must rely on awkward data entry techniques to achieve the reconciliation.

What is needed is a system which allows a user of an information processing device to readily reconcile two or more schedules, or other time-based lists. The present invention fulfills this and other needs.

SUMMARY OF THE INVENTION

Computers have found a variety of applications for the management of one's time, including tracking meetings and appointments. With increased availability of portable information processing devices, many of the scheduling features found on personal computers are now available with handheld electronic organizers. Because handheld organizers sacrifice features for portability, professionals will often manage their time at the office with a personal computer, reserving the portable for when they are away. Upon returning to the office, however, one must reconcile the information stored in the portable with that already present in the personal computer.

According to the present invention, therefore, a method for reconciling two sets of information on an information processing system includes loading both sets of data, detecting the current date, building a new list for each set of data, synchronizing the lists (typically, according to time), and displaying the synchronized lists.

Upon display of the synchronized lists, the user may employ any of a variety of interface techniques for transferring information between the two synchronized lists. For example, the user may pick and choose from the two lists, as desired, including the deletion of undesirable entries. In addition, the information may be prioritized; for example, one list—the "master"—may always be given priority over another list. Alternatively, information may be prioritized according to level (e.g., "high", "medium", "low") when it is entered (or any time thereafter). Upon completion of the reconciliation between the synchronized lists, the parent tables from which the information originated are respectively updated.

A system for processing multiple schedules, constructed in accordance with the principle of the present invention, includes an information processing system having a memory and a processor; an input device, such as a keyboard, for entering user information; a display device for showing scheduling information; an interface for sending and/or receiving information from another source; and means for reconciling two schedules by building synchronized lists, from which the user may effect a reconciliation.

BRIEF DESCRIPTION OF THE DRAWINGS

FIGS. 3A–B illustrate two schedules, one from a laptop, the other from a desktop, which require reconciliation.

DETAILED DESCRIPTION

Figure 1:
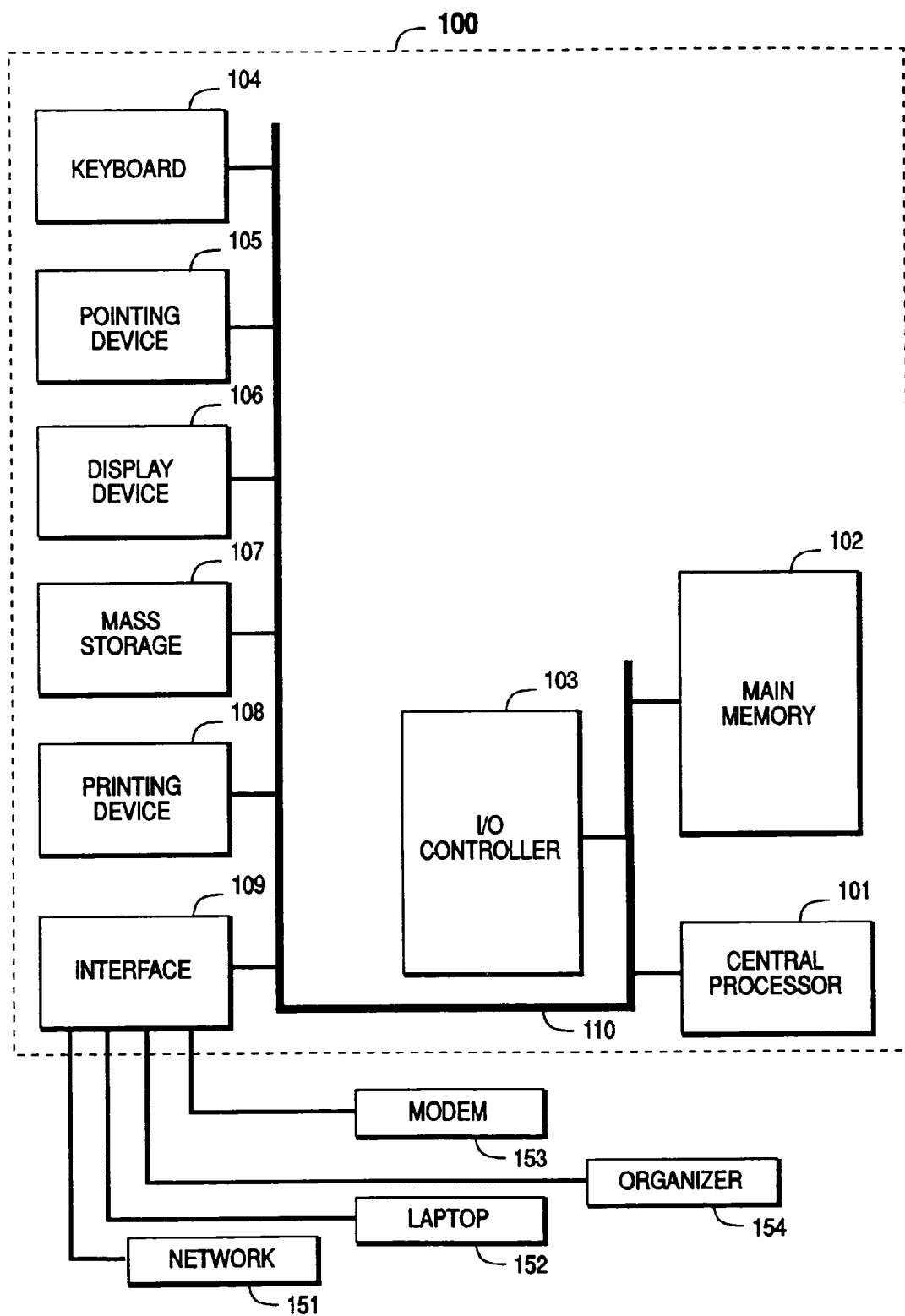
FIG. 1 is a block diagram of a computer system in which the present invention may be embodied.

The present invention may be embodied on an information processing system such as the system 100 of FIG. 1 which comprises a central processor 101, a main memory 102, an I/O controller 103, a keyboard 104, a pointing device 105 (e.g., mouse), a screen or display device 106, a mass storage 107, (e.g., hard disk), a printing device 108, and an interface 109. The various components of the system 100 communicate through a system bus 110 or a similar architecture. In addition, the system 100 may communicate with other devices through the interface or communication port 109, which may be an RS-232 serial port or the like. Devices which will be commonly connected to the interface 109 include a network 151 (e.g., LANS), a laptop computer 152, an organizer 154 (e.g., Sharp Wizard™), a modem 153, and the like.

In operation, the user enters commands through the keyboard 104 and/or pointing device 105 which is typically a mouse, a track ball, or the like. The computer system displays text and/or graphic images and other data on the display device 106, such as a cathode-ray tube or an LCD display. A hard copy of the displayed information, or other information within the system 100, may be obtained from the printing device 108. In a preferred embodiment, the computer system 100 is an appropriately programmed is an IBM PC-compatible personal computer (available from a variety of vendors, including IBM of Armonk, New York) running MS-DOS (available from Microsoft Corporation of Redmond, Wash.).

In this interactive computer system, the user enters scheduling and other time information with the keyboard 104 and/or pointing device 105. Alternative sources of information are available through the interface 109. Once entered, the information is stored in the memory 102 where it may be analyzed by processor 101. After appropriate formatting, the information is conveyed to the user by the display device 106 and/or printing device 108. The information may be saved for future use by storing it in the mass storage 107.

Figure 2:
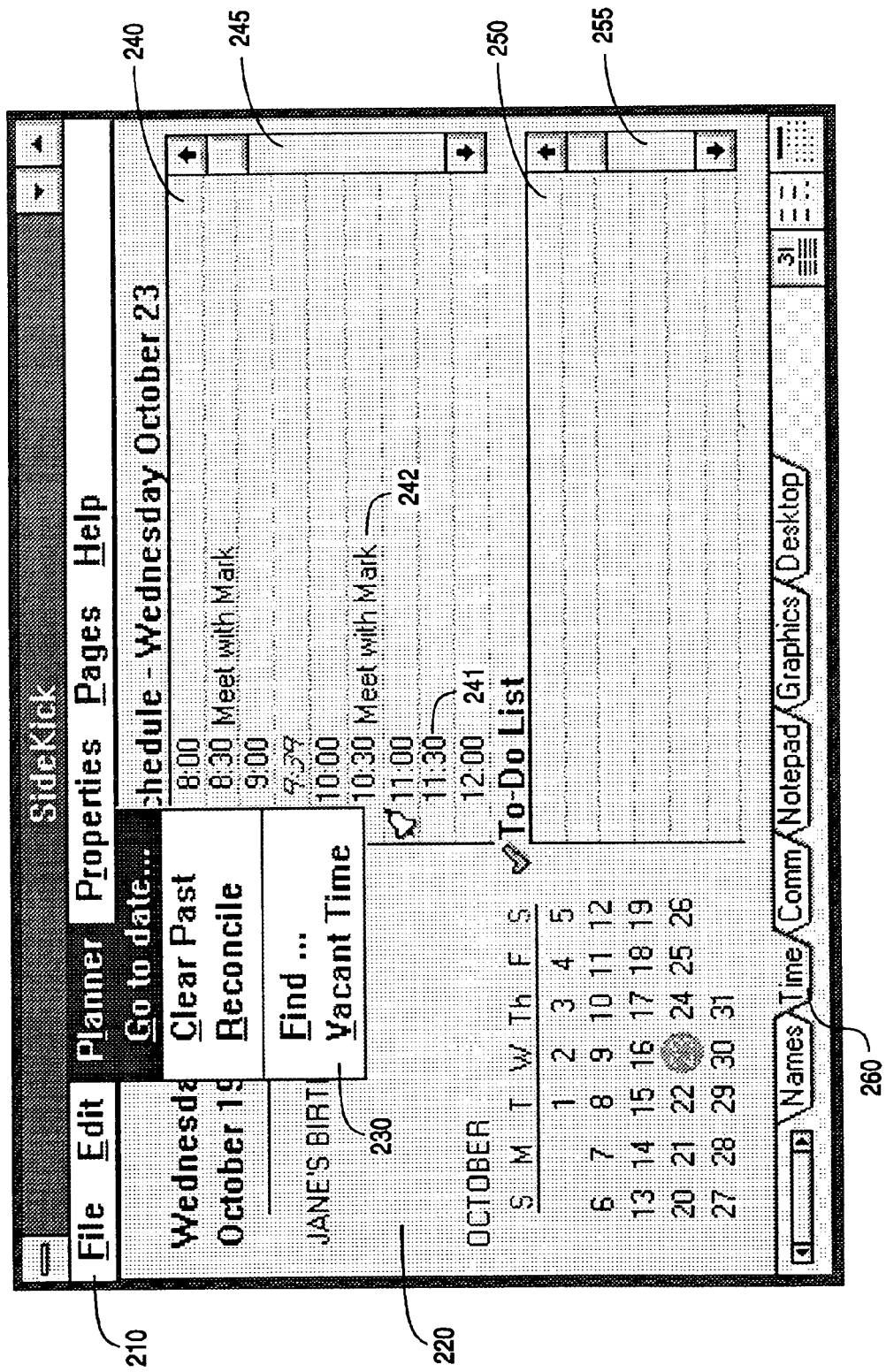
FIG. 2 represents a display window of the present invention for entering and processing schedule information.

As shown in FIG. 2, the system 100 provides a window or work space 200 for display on the screen 106. Window 200 is a rectangular, graphical user interface for viewing and manipulating textual and graphical information. Window 200 contains a main menu 210 with a plurality of submenus, such as a "planner" submenu 230. From the submenus, the user may select a desired choice with the keyboard 104 or the pointing device 105. Of particular interest to the present invention is the "reconcile" item, which is available from the submenu 230.

Window 200 also includes a client area 220 for the display of time and scheduling information. Client area 220 may be partitioned into individual modules of information, such as the scheduling window 240 and the to-do list window 250. Additional information may be viewed in the windows 240, 250 by activating scroll bars 245 and 255, respectively. Window 200 also includes a plurality of other work surfaces (e.g., such as a communication module) which are accessible by selecting an appropriate tab 260 with the keyboard or pointing device.

Within the window 240, a plurality of fields is available for the display of scheduling information. For example, field 242 is a text field for indicating the nature of the scheduling event. Field 241, on the other hand, lists the start time associated with the event. As shown, field 241 lists start time at a user-selected interval, e.g., thirty minutes; in addition, irregular start times (those not falling exactly on the defined intervals) are also accommodated. Additional screen indicia, such as screen icons, colors, or particular fonts, may be employed to convey additional information, such as the setting of an alarm for an event.

Reconciling Schedules: User Interface

The following description will focus on the reconciliation of disparate scheduling information. The present invention is, however, not limited to such a specific application but, instead, may be applied advantageously to reconcile a variety of table or set-oriented information, particularly that which is temporal in nature. Thus, the following is offered for purposes of illustration and not limitation.

Figure 3C:
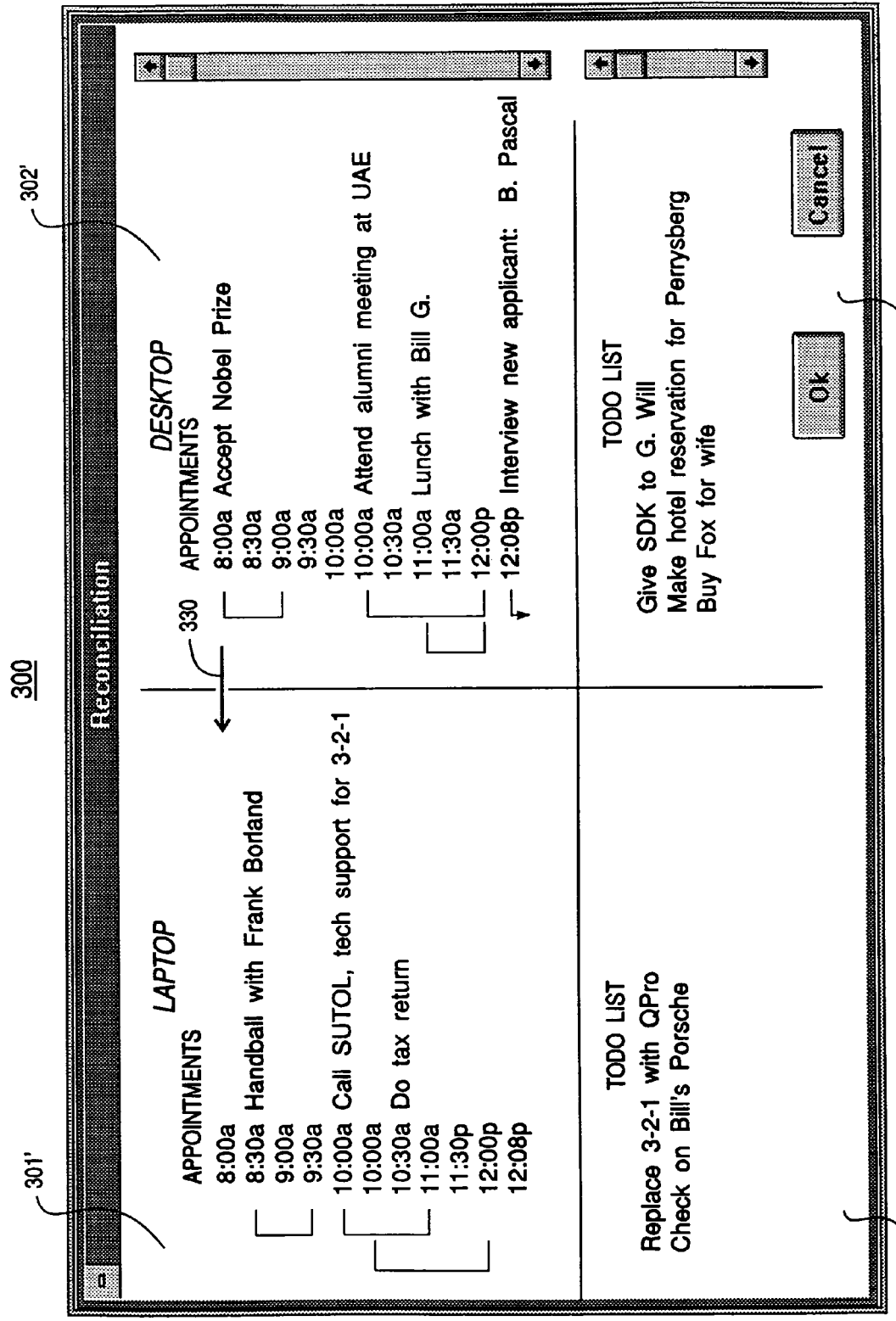
FIG. 3C represents a display window for reconciling two schedules.

Referring now to FIGS. 3A–F, the reconciliation of information in accordance with the present invention is illustrated. With particular reference to FIGS. 3A–B, a first set of information 301 is to be reconciled with a second set of information 302. Information 301 will typically be accumulated independent (i.e., separate) from the information 302. For example, information 301 may represent scheduling information which has been entered on a portable device, such as a laptop computer 152 or a handheld organizer 154. Alternatively, each set of information may be accumulated and stored on a network 151, but at separate nodes (e.g., set 301 being a secretary's copy of a schedule, and set 302 being an executive's corresponding copy). Regardless of origin, the sets will share a common format (or be translatable into a common format) but, typically, will differ as to the exact information content shared between them.

As shown in FIG. 3A, information set 301 includes a plurality of events 305, denoted by appropriate indicia such as textual messages. Displayed proximate each event message is a time 306, representing the start time for the event. In operation, a user will typically specify the "granularity" (i.e., the interval) for displaying event information. In information table 301, for example, the granularity has been set equal to thirty minutes. In this manner, table 301 is displayed as a plurality of time slots, each slot spaced at a thirty minute interval. In addition to specifying a time interval, the user will typically select a starting and stopping time for each day. A typical value for a starting time would be 8:00 a.m., while a typical value for a stopping or ending time would be 6:00 p.m.

In addition to displaying textual messages and units of time, additional screen feedback 304 is provided. As shown, screen feedback 304 may include graphic symbols or textual messages to convey further information. For example, a musical note may be displayed to indicate that an alarm will be sounded when the event occurs. The letter "R" may be displayed proximate a time value to indicate that the event is a repeating event. In a similar manner, the duration of an event may be conveyed by illustrating a line from the start time of the event to its ending time (determined from the specified duration). As shown, events may overlap one another, whereby the duration lines are drawn in an overlapping fashion.

A corresponding set of information 302 is shown in FIG. 3B. Set or table 302 employs the same or similar format as that just described for set 301. As shown, however, specific differences exist between the two tables 301, 302. In particular, set 301 employs a coarser level of granularity (sixty minutes) than that chosen for set 301. Furthermore, the events stored in set 302 are different than those stored in set 301, with some events even being in direct conflict. As illustrated by time slot 307, the start time for an event can be irregular (i.e., not correspond exactly with the predefined time slot).

The actual reconciliation is accomplished as follows. The user requests reconciliation, for example, by selecting the "reconcile" option from the submenu 230 (of FIG. 1). As shown in FIG. 3C, the two tables 301, 302 are loaded into a reconciliation window 300, which is displayed on the screen 106. In particular, table 301 is displayed in client area 301', while table 302 is displayed in client area 302'. As illustrated, the two tables have been synchronized to facilitate reconciliation by the user. In this case, table 302 (which originally had a granularity of sixty minutes) is now displayed with the same granularity as table 301.

This "synchronizing" process allows the user to better visualize the reconciliation, thus improving his or her ability to resolve any conflicts (in those cases where automatic conflict resolution, such as based on priority, has not been enabled). Employing a user interface element, such as an insertion arrow 330, the user may readily transfer events from one list to another by selectively specifying the desired event and the direction of insertion. The user may also globally insert one list into another, as desired.

In addition to reconciling scheduling information, the user may reconcile a list of priorities, such as a "to do" list. While not shown, each to do event may include a due date, a priority level, as well as any other desired information. In a manner similar to that for reconciling scheduling information, the to do lists of client areas 341, 342 may be reconciled, for example by synchronizing corresponding due dates.

Figure 3D:
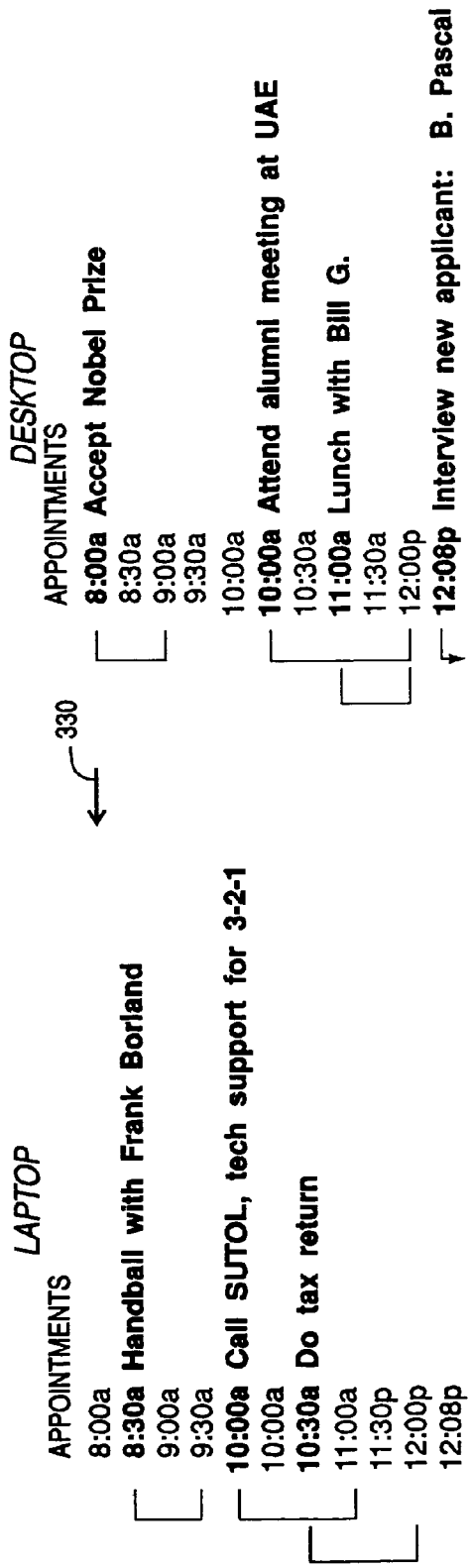
FIGS. 3D–G represent the user directed process (and screen feedback) for reconciling the two schedules of FIGS. 3AB.

Referring to FIGS. 3D–G, a "point-and-shoot" technique for reconciling the schedules 301, 302 is illustrated. FIG. 3D represents the display of the synchronized tables just before reconciliation of the first event. In this example, the user wishes to copy the 8:00 a.m. appointment from the desktop to the laptop. Thus, the insertion arrow 330 is positioned in the 8:00 a.m. time slot (e.g., by pressing appropriate cursor keys on the keyboard 104). Also at this point, the user has specified (e.g., with the keyboard or the mouse) that the laptop information table will be the recipient table. Next, the event is inserted in the recipient table in response to a user event, such as pressing a function key or clicking a mouse button.

Various masks may be applied by the system 100 at this point to block the reconciliation between selected fields. For example, the recipient table (e.g., that of an executive) may mask a lunch period so that an updating table (e.g., from a secretary) cannot assert entries into those blocked fields. In a similar manner, a priority event in one table may mask those time slots covered by its duration so that events from another table may not be inserted thereat.

Figure 3E:
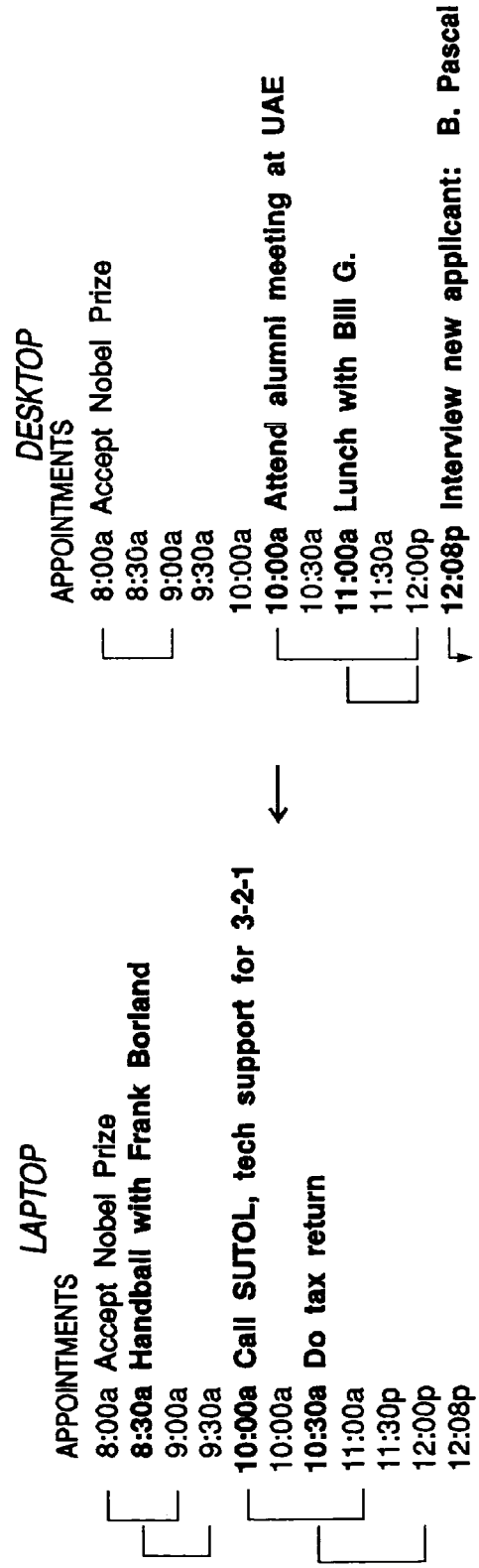

As shown in FIG. 3E, the 8:00 a.m. time entry has been reconciled between the two lists and is, therefore, no longer highlighted (bold font) as an unreconciled event. Also showing in FIG. 3E, the user has selected the 10:00 a.m. event of the desktop for insertion into a corresponding time slot in the laptop schedule. Since an event is already scheduled in this timeslot (i.e., it conflicts), the system 100 generates a duplicate 10:00 a.m. field. In this manner, the user may reconcile events which not only overlap in duration but also conflict as to start time. Alternatively, the user may specify that an event is exclusive—cannot overlap with other events—and therefore will not be reconciled in the manner just described.

Figure 3F:
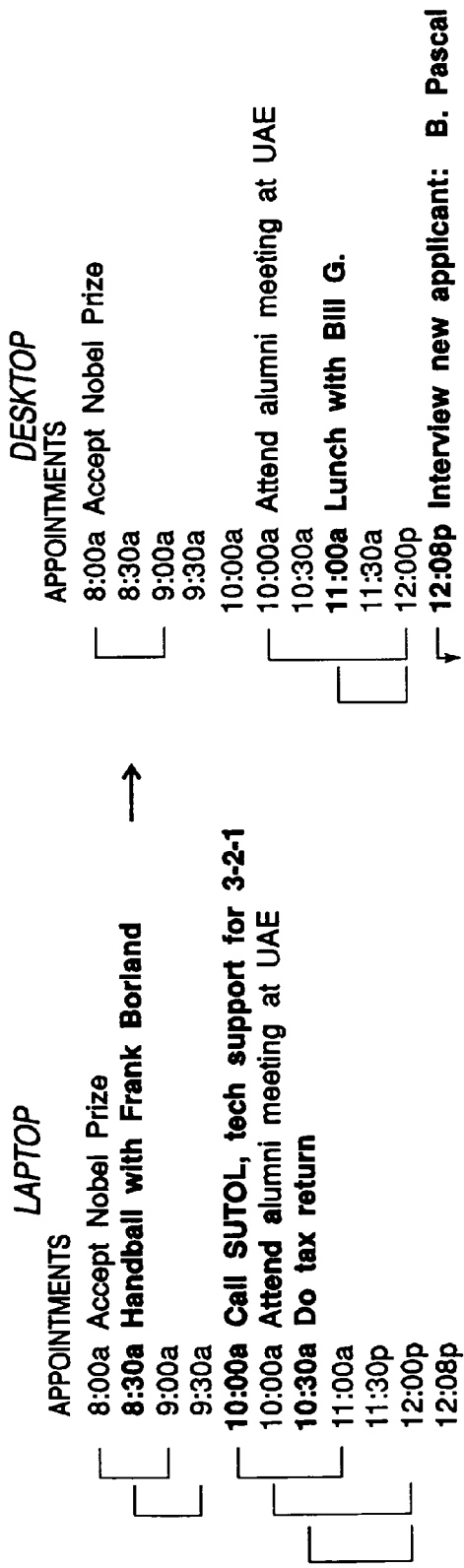

The completed operation of the previously described reconciliation step is shown in FIG. 3F. In particular, the 10:00 a.m. event from the desktop schedule has been copied to the corresponding time slot on the laptop schedule. Also shown in FIG. 3F, the user may reverse the direction of reconciliation (indicated by the direction of the insertion arrow) such that events are inserted from the laptop schedule into the desktop schedule. In this case, the 8:30 a.m. appointment from the laptop schedule is inserted into the desktop schedule.

Figure 3G:
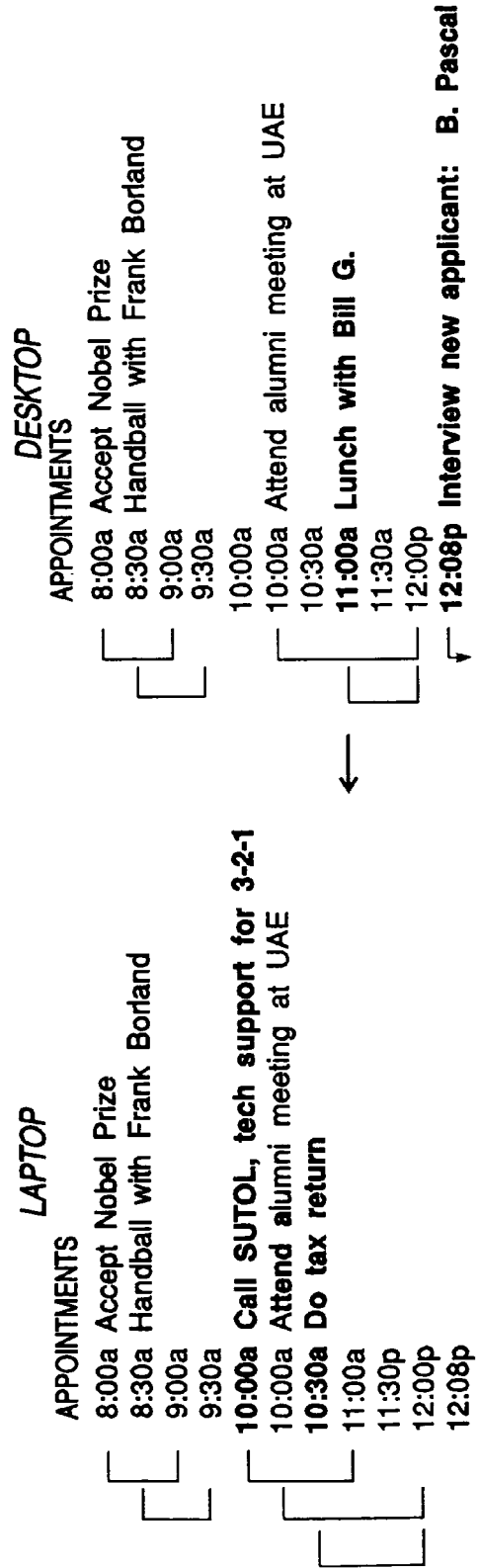

The completion of this step is shown in FIG. 3G, where the desktop schedule now includes the 8:30 event from the laptop schedule. The user may continue this process as desired, including editing and deleting selected events.

Reconciliation of Schedules: Internal Operations

Figure 4A:
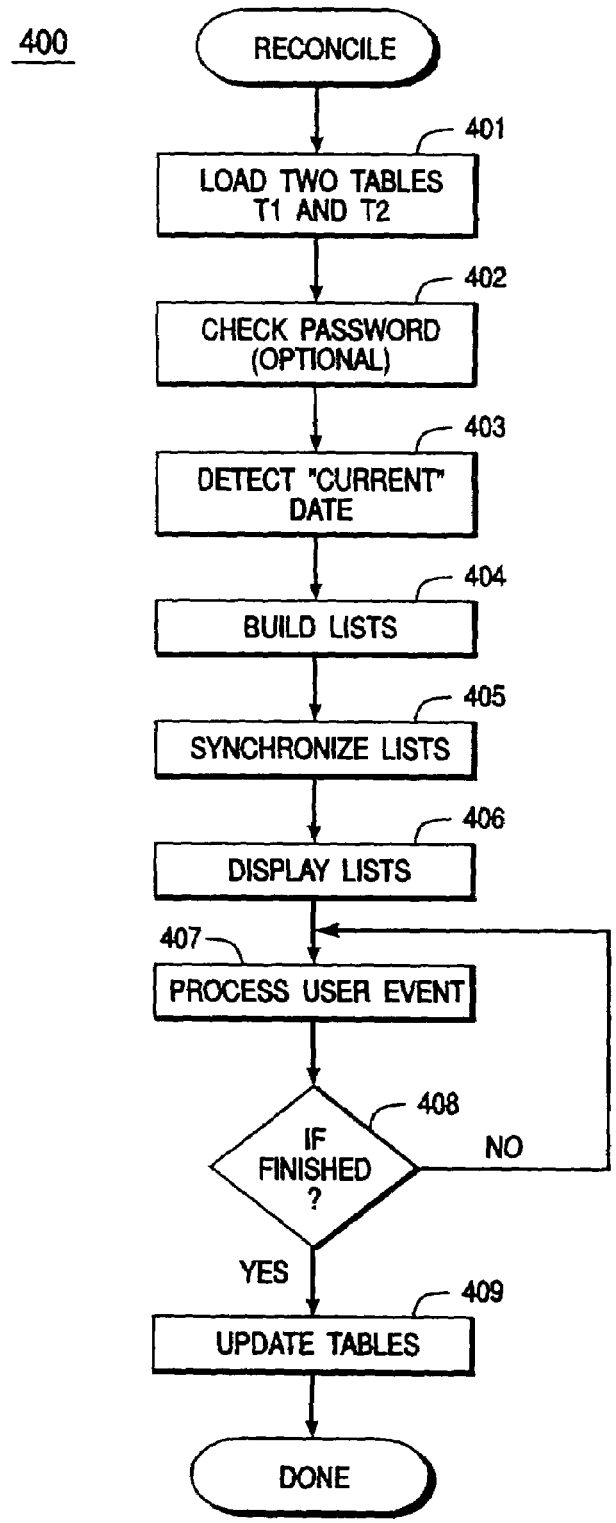
FIG. 4A is a flowchart of the reconciliation method of the present invention.
Figure 4B:
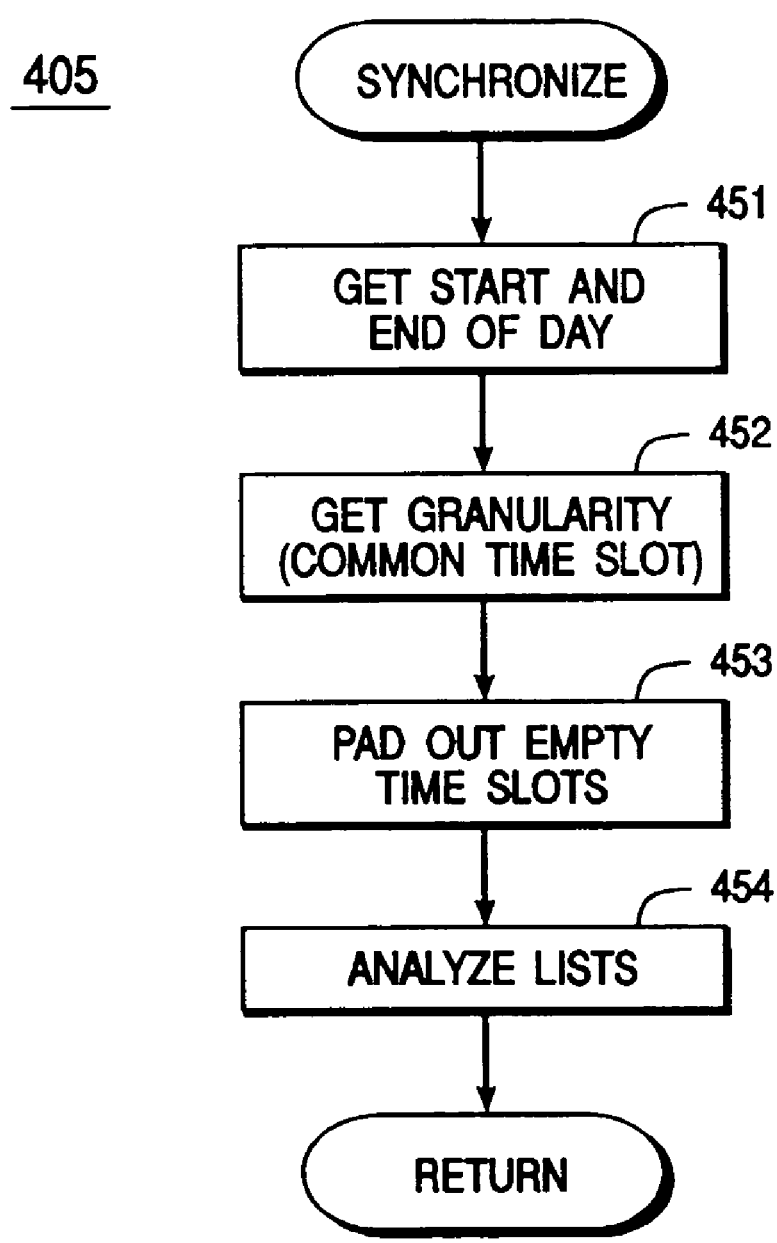
FIG. 4B is a flowchart of the synchronizing step of the present invention.

Referring now to FIGS. 4A–B, a method according to the present invention for reconciling two or more sets of information is illustrated. The steps for the reconcile method 400 are as follows. In step 401, the two tables or sets of information to be reconciled (T1 and T2) are loaded into the system (e.g., from mass storage 107, organizer 154, network 151, or the like). The formatting and storing of information into sets or database tables is known in the art; see e.g., Date, C. J., *An Introduction to Database Systems*, volumes I and II, Addison Wesley, 1983; the disclosure of which is hereby incorporated by reference. At this point, the system may (optionally) verify user access, for example, by checking passwords.

At step 403, the "current" date is retrieved. The current date is not necessarily the same as the system date, which is automatically tracked by the system 100. Instead, the current date is the date of interest to the user. In particular, the user may toggle through various days, both past and present. As an example, FIG. 2 includes a current date of Wednesday, October 23. In step 404, a derivative or child table is built for tables T1 and T2. Moreover, in step 405 the newly created child tables or lists are synchronized (e.g., according to time slots).

Figure 5:
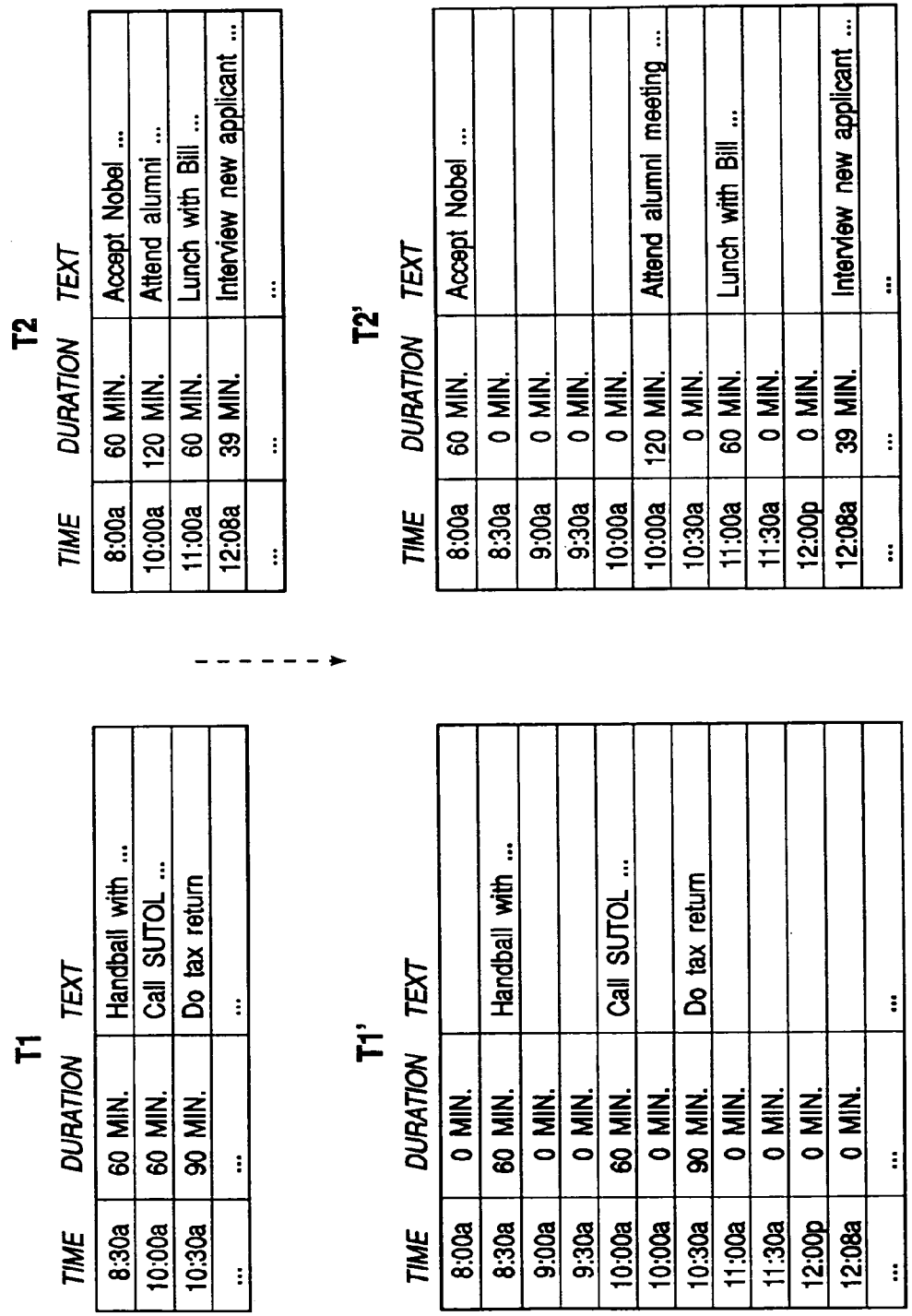
FIG. 5 illustrates the synchronization of two tables or sets of information.

The step of synchronizing the tables, step 405, is illustrated in further detail by FIG. 4B and FIG. 5. The substeps are as follows. In step 451, the starting time and ending time for tables T1 and T2 are obtained. This will determine the maximum range of time which must be covered by the synchronizing tables. For example, if one table has a range from 7:00 a.m. to 4:00 p.m., while another has a range from 9:00 a.m. to 5:00 p.m., then the synchronizing tables must cover a range from 7:00 a.m. to 5:00 p.m. In a similar manner, the granularity for the parent tables T1 and T2 are obtained in step 452. This information is used to establish common time slots between the two synchronizing tables. For example, schedule table 301 and schedule table 302 (from FIGS. 3A–B) have the interval of thirty minutes as a common denominator (finest level of granularity). Accordingly, the synchronizing tables will employ this determined granularity. In step 453, entries are "padded out" (i.e., receive null values or whitespace characters) for time slots which must be added to effect the synchronization. As shown in FIG. 5, for example, the child table T2' has four time slots padded between its first event (8:00 a.m.) and its second event (10:00 a.m.). Similar padding for other time slots is likewise illustrated. Upon completion of step 453, the lists are analyzed to match up common time slots. For example, the 8:30 a.m. time slot of T1' is aligned with the 8:30 a.m. time slot of T2'. Also at this step, any automated reconciliation, (e.g., insertion of nonconflicting events) may be performed.

After completion of step 454, the method returns to step 406 to display the synchronized lists. Next, in step 407, the system enters an event loop to process user events, such as keyboard or mouse events. During this loop, the user may execute any of the previously described reconciliation activities (e.g., insertion, deletion, editing, and the like). User events are repeatedly interpreted until the user indicates that he or she is finished (at step 408). Upon completion of the reconciliation, the parent tables T1 and T2 are updated from T1' and T2', respectively.

Recoloring Screen Objects

Figure 6:
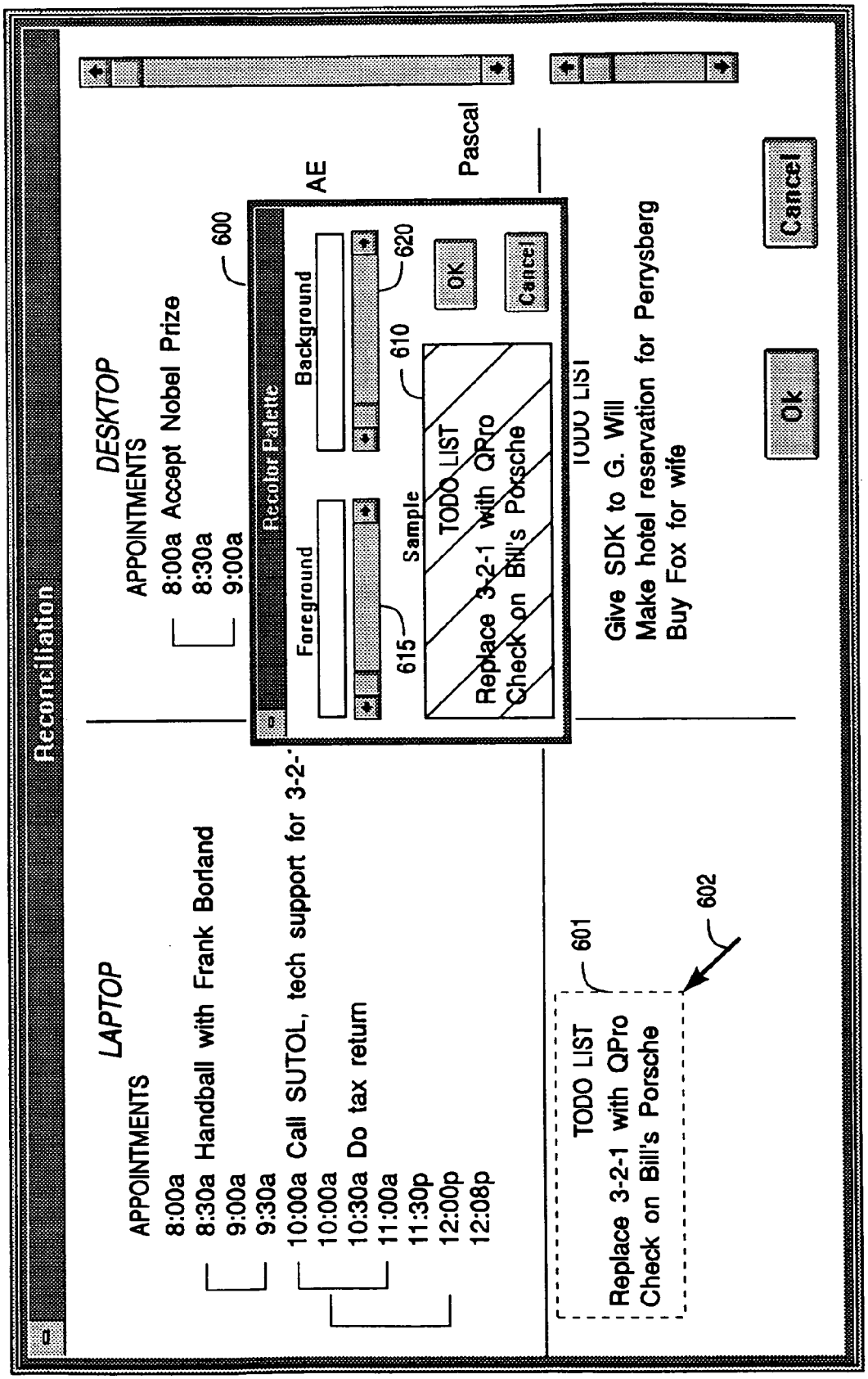
FIG. 6 is a display screen view showing a technique for changing the color of one or more selected screen objects in accordance with the present invention.

Referring now to FIG. 6, a technique for changing the screen colors (or other attributes) of screen objects in accordance with the present invention is illustrated. Using the keyboard 401 or the pointing device 105, the user selects a screen object. As shown, the user has created a selection box 601 by dragging a mouse cursor 602 (i.e., moving a mouse device with one button continually depressed). The sample block so selected is then copied into a recolor palette dialog box 600. At this point, the user may adjust the palette for the particular object in sample box 610, for example by activating foreground 615 and/or background 620 controls. Simultaneous with the operation of controls 615, 620, the sample window 610 is updated with new palette values, accordingly. In this manner, the user may isolate specific screen regions or objects and experiment with different attributes, such as palette, without altering the underlying work surface. Unlike prior techniques, however, the user may actually preview the change as applied to the object of interest.

Figure 7:
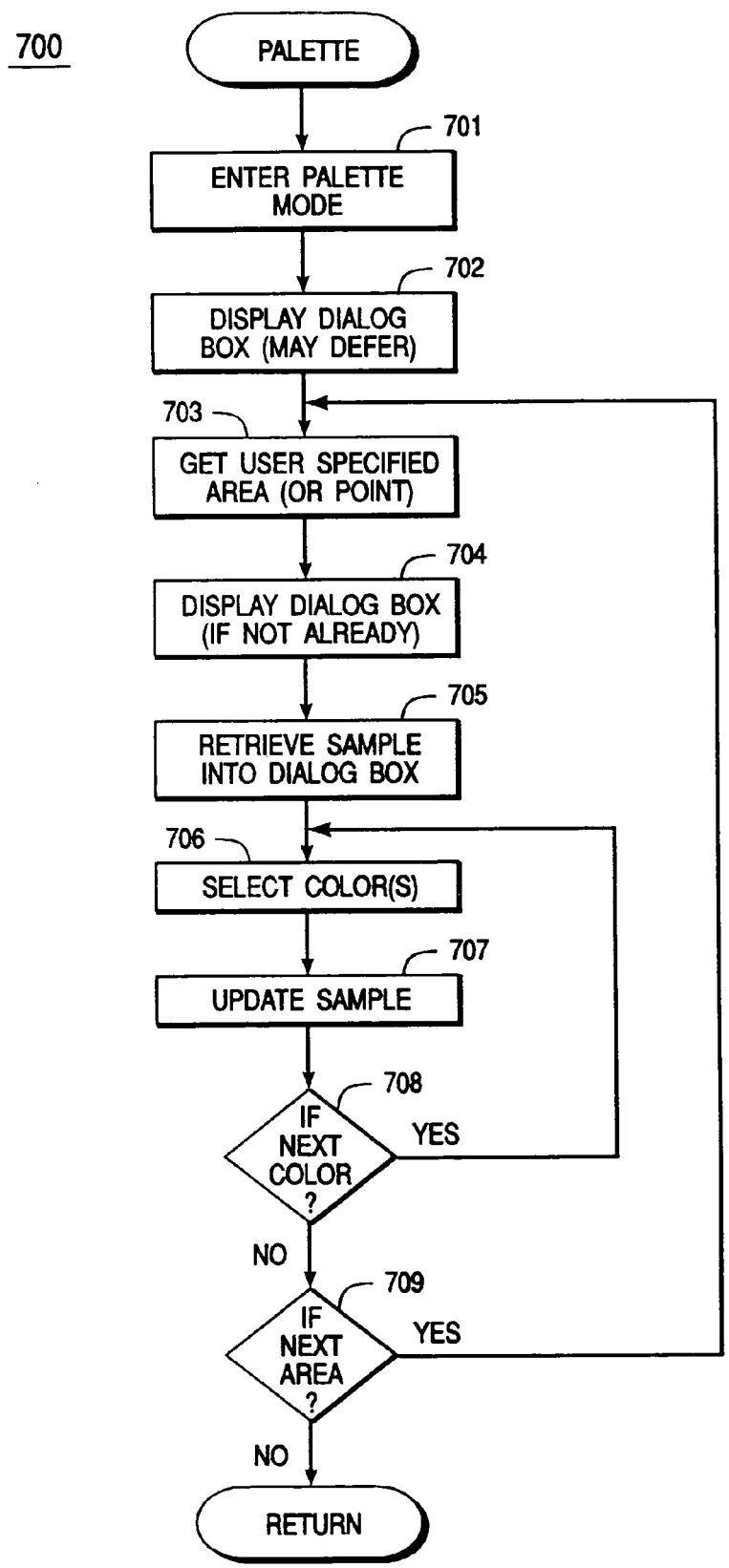
FIG. 7 is a flowchart of a method of the present invention for recoloring screen objects.

Referring now to FIG. 7, a method for recoloring screen regions or objects is illustrated. In step 701, the user enters a palette or recoloring mode, for example by pressing a predefined function key. In step 702, the recoloring dialog box 600 may be displayed; alternatively, the display of the dialog box may be deferred until after step 703. In step 703, the user specifies a region or object of interest. Typically, the user will employ a screen cursor (mouse pointer) to indicate a region of interest. The user may indicate a single point, in which case a default boundary is selected; or, the user may specify an area with two points, such as a bounding box. In step 704, the display dialog box 600 is shown on the screen (if not displayed already). In step 705, the user-specified region is retrieved into the sample box 610. For character-based user interfaces, the appropriate screen buffer may be copied. For graphical user interfaces, such as Microsoft's Windows™, a captured bitmap may be shown. In step 706, the user selects new colors, for example using scroll bar components 615, 620. Contemporaneous with this step, the sample is updated with new palette or color values. In step 708, if additional colors are desired, the method loops back to step 706; otherwise, the method continues on to the next step. At step 709, the user may select another region or object for recoloring, in which case the method loops back to step 703. The dialog box 600 may be moved or hidden (for example, by sending window move or window destroy commands), and then later redisplayed in step 704.

While the invention is described in some detail with specific reference to a single preferred embodiment and certain alternatives, there is no intent to limit the invention to that particular embodiment or those specific alternatives. The true scope of the invention is defined not by the foregoing description but by the following claims.

What is claimed is:

1. A computer-implemented method for synchronizing information between two data sets, the method comprising:
   receiving a request to synchronize information between a first data set and a second data set;
   detecting a difference between the first data set and the second data set which prevents synchronization being performed directly on said first and second data sets;
   based on the detected difference, creating a first derived data set and a second derived data set suitable for synchronizing information between the first and second data sets, by
      determining a data set structure suitable for synchronizing information between the two data sets, and
      based on the determined data set structure, mapping information from the first data set into the first derived data set and mapping information from the second data set into the second derived data set; and
   synchronizing information between the first and second data sets by synchronizing information between the first and second derived data sets, and
      selectively copying information from the first derived data set into the first data set and selectively copying information from the second derived data set into the second data set.

2. A computer-implemented method for synchronizing information between two data sets, the method comprising:
   receiving a request to synchronize information between a first data set and a second data set;
   detecting a difference between granularity of information represented in the first data set and the second data set which impedes synchronization being performed directly on the two data sets;
   based on the detected difference, creating at least one intermediate data set for synchronizing information between the first and second data sets, said at least one intermediate data set having a granularity which is compatible for synchronizing information in both the first data set and the second data set; and
   synchronizing information between the first and second data sets using said at least one intermediate data set.

3. The method of claim 2, wherein:
   said first and second data sets each comprise a table having entries; and
   said synchronizing step includes copying values from a source entry of one table to a corresponding target entry in the other table.

4. The method of claim 3, wherein said copying step includes:
   receiving user input specifying which entry should serve as the source entry and which entry should serve as the target entry.

5. The method of claim 2, wherein said first and second data sets originally reside on separate input devices, prior to synchronization.

6. The method of claim 2, wherein said first and second data sets comprise scheduling information.

7. The method of claim 2, wherein said first and second data sets each comprise a table having entries and wherein said synchronizing step further comprises:
   receiving user input for selectively blocking synchronization of particular entries.

8. The method of claim 2, wherein at least one of the data sets is electronically transmitted from a portable electronic device.

9. A computer-implemented method for synchronizing information between two data sets, the method comprising:
receiving a request to synchronize information between a first data set and a second data set;
detecting a difference between the first data set and the second data set which impedes, synchronization being performed directly on the two data sets;
based on the detected difference, creating at least one intermediate data set for synchronizing information between the first and second data sets; and
synchronizing information between the first and second data sets using said at least one intermediate data set;
wherein said creating step includes:
determining a data set structure suitable for synchronizing information between the first and second data sets;
based on the determined data set structure, creating a first derived data set and mapping information from the first data set into the first derived data set; and
based on the determined data set structure, creating a second derived data set and mapping information from the second data set into the second derived data set.

10. The method of claim 9, wherein said synchronizing step includes:
synchronizing information between the first and second derived data sets; and
selectively copying information from the first derived data set into the first data set and selectively copying information from the second derived data set into the second data set.

11. A system for synchronizing sets of information comprising:
an information processing system having a memory and a processor;
means for receiving first and second sets of information, each set comprising a plurality of entries;
means for creating at least one synchronization data structure for facilitating synchronization of said first and second sets of the information; and
means for synchronizing said first and second sets of information comprising:
means for transferring at least some information from said first and second sets of information into said at least one synchronization data structure, and
means for synchronizing individual entries from said first and second sets of information using said at least one synchronization data structure;
wherein said at least one synchronization data structure comprises first and second derived data sets, said first and second derived data sets being compatible for synchronization of individual entries.

12. The system of claim 11, wherein said first derived data set includes information mapped from said first set of information, and wherein said second derived data set includes information mapped from said second set of information.

13. The system of claim 11, wherein said means for synchronizing said first and second sets of information further comprises:
means for selectively copying information from said at least one synchronization data structure back into said first and second sets of information.

14. The system of claim 11, further comprising:
means for displaying to a user corresponding entries between said first and second sets of information.

15. The system of claim 14, further comprising:
input means for receiving user input for selectively blocking synchronization of particular entries from said first and second sets of information.

16. A system for synchronizing sets of information comprising:
an information processing system having a memory and a processor;
means for receiving first and second sets of information, each set comprising a plurality of entries;
means for creating at least one synchronization data structure for facilitating synchronization of said first and second sets of the information; and
means for synchronizing, said first and second sets of information comprising:
means for transferring at least some information from said first and second sets of information into said at least one synchronization data structure, and
means for synchronizing individual entries from said first and second sets of information using said at least one synchronization data structure;
wherein said means for synchronizing individual entries comprises means for automatically performing reconciliation.

17. The system of claim 16 wherein said means for automatically performing synchronization comprises means for automatically inserting nonconflicting information entries from said first and second sets of information into said at least one synchronization data structure.

18. The system of claim 16 wherein said means for automatically performing synchronization comprises means for resolving conflicts based on priority.

19. The system of claim 18 wherein said means for resolving conflicts based on priority utilizes priority information associated with individual entries from said first and second sets of information.

20. The system of claim 16 further comprising means for accepting user input for directing conflict resolution, wherein said means for synchronizing individual entries from said first and second sets of information comprises means for resolving conflicts based on said user input.

21. In an information processing system, a method for reconciling at least two information sets, including a first information set and a second information set, using at least a third information set, the method comprising:
receiving a request to reconcile the at least two information sets, said at least two information sets including information entries which are initially incompatible for reconciling;
including information entries from the first information set into the third information set;
selectively inserting information entries from the second information set into the third information set, said third information set now containing information entries that are compatible for reconciling the first and second information sets; and
updating the first information set with information from the third information set.

22. The method of claim 21 wherein the step of including information entries comprises initially including all information entries from the first information set into the third information set.

23. The method of claim 22 further comprising, before the step of including information entries, creating the third information set in response to the received request to reconcile.

24. The method of claim 21 further comprising updating the second information set with information from the at least the third information set, including information entries originating from the first information set.

25. The method of claim 21 further comprising loading the first and second information sets into the information processing system, wherein information in the first information set has been accumulated separately from information in the second information set.

26. The method of claim 21 further comprising obtaining at least one date of user interest, wherein the at least two information sets includes information associated with dates.

27. In an information processing system, a method for reconciling at least two information sets, including a first information set and a second information set, using at least a third information set, the method comprising:
receiving a request to reconcile the at least two information sets;
including information entries from the first information set into the third information set;
selectively inserting information entries from the second information set into the third information set for reconciling the first and second information sets; and
updating the first information set with information from the third information set:
wherein the step of selectively inserting information entries comprises automatically performing reconciliation.

28. The method of claim 27 wherein the step of automatically performing reconciliation comprises automatically inserting non-conflicting information entries into the third information set.

29. The method of claim 28 wherein the non-conflicting entries that are inserted include events.

30. The method of claim 28 wherein the step of automatically performing reconciliation comprises automatically resolving conflicts based on priority.

31. The method of claim 30 wherein information from the first information set has priority over information from the second information set.

32. The method of claim 30 wherein information entries from the first and second information sets have been prioritized according to level.

33. In an information processing system, a method for reconciling at least two information sets, including a first information set and a second information set, using at least a third information set, the method comprising:
receiving a request to reconcile the at least two information sets;
including information entries from the first information set into the third information set;
selectively inserting information entries from the second information set into the third information set for reconciling the first and second information sets;
updating the first information set with information from the third information set; and
if automatic conflict resolution is not enabled, accepting user input for directing conflict resolution.

34. The method of claim 33 wherein the user input for directing conflict resolution includes user input for deleting an undesired information entry.

35. The method of claim 33 wherein the user input for directing conflict resolution includes user input for editing an information entry.

36. In an information processing system, a method for reconciling information between two data sets, the method comprising:
receiving a request to reconcile information between a first data set and a second data set;
providing at least one intermediate data set for reconciling information between the first and second data sets based on a compatibility difference between the first and second data sets which impedes reconciliation being performed directly on the first and second data sets, said at least one intermediate data set being created to achieve compatibility for reconciling information between the first data set and the second data set; and
reconciling information between the first and second data sets using said at least one intermediate data set.

37. In an information processing system, a method for reconciling information between two data sets, the method comprising:
receiving a request to reconcile information between a first data set and a second data set;
providing at least one intermediate data set for reconciling information between the first and second data sets based on a compatibility difference between the first and second data sets which impedes reconciliation being performed directly on the first and second data sets, said at least one intermediate data set being created to achieve compatibility for reconciling information between the first data set and the second data set; and
reconciling information between the first and second data sets using said at least one intermediate data set;
wherein the at least one intermediate data set includes a first intermediate data set, and the reconciling step comprises selectively inserting information entries from the first and second data sets into the first intermediate data set.

38. The method of claim 37 wherein the step of selectively inserting information entries comprises inserting information entries that overlap with one another, if the overlapping information entries have not been designated as being exclusive.

* * * * *